(12) United States Patent
Wilkinson et al.

(10) Patent No.: US 9,497,770 B2
(45) Date of Patent: Nov. 15, 2016

(54) SCHEDULING COMMUNICATION IN A WIRELESS COMMUNICATION SYSTEM

(75) Inventors: Timothy Wilkinson, Bristol (GB); Timothy James Speight, Bristol (GB)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 455 days.

(21) Appl. No.: 13/883,687

(22) PCT Filed: Nov. 8, 2011

(86) PCT No.: PCT/EP2011/069663
§ 371 (c)(1),
(2), (4) Date: Jul. 22, 2013

(87) PCT Pub. No.: WO2012/062765
PCT Pub. Date: May 18, 2012

(65) Prior Publication Data
US 2013/0286873 A1    Oct. 31, 2013

(30) Foreign Application Priority Data
Nov. 12, 2010    (GB) .................................. 1019145.0

(51) Int. Cl.
*H04W 72/12*    (2009.01)
*H04W 72/08*    (2009.01)

(52) U.S. Cl.
CPC ....... *H04W 72/1231* (2013.01); *H04W 72/082* (2013.01); *H04W 72/1226* (2013.01)

(58) Field of Classification Search
CPC ........... H04W 72/082; H04W 72/1226; H04W 72/123
See application file for complete search history.

(56) References Cited

U.S. PATENT DOCUMENTS

| | | | |
|---|---|---|---|
| 2002/0105918 A1 | 8/2002 | Yamada et al. | |
| 2004/0023671 A1* | 2/2004 | Rudolf | H04W 64/00 455/456.5 |
| 2007/0086379 A1* | 4/2007 | Takayanagi | H04W 88/08 370/329 |
| 2007/0243874 A1* | 10/2007 | Park | H04W 72/082 455/442 |
| 2008/0002598 A1 | 1/2008 | Beser | |
| 2008/0212506 A1* | 9/2008 | Lee | H04W 72/042 370/310 |
| 2009/0131067 A1 | 5/2009 | Aaron | |

(Continued)

FOREIGN PATENT DOCUMENTS

| | | |
|---|---|---|
| JP | 2003333646 A2 | 11/2003 |
| WO | 2003/017696 A1 | 2/2003 |

(Continued)

OTHER PUBLICATIONS

International Preliminary Report on Patentability, PCT/EP2011/069663, issued May 14, 2013.
Written Opinion, PCT/EP2011/069663, issued May 12, 2013.

*Primary Examiner* — Warner Wong
(74) *Attorney, Agent, or Firm* — Volpe and Koenig, P.C.

(57) ABSTRACT

Interference potential may be determined between user equipment (UE) based on distance between the UEs and location information. Half duplex communication on orthogonal frequency division multiplexing (OFDM) resources may be scheduled based on the determined interference potential.

15 Claims, 5 Drawing Sheets

(56) References Cited

U.S. PATENT DOCUMENTS

| | | |
|---|---|---|
| 2009/0135748 A1 | 5/2009 | Lindoff et al. |
| 2010/0080163 A1* | 4/2010 | Krishnamoorthi .... H04L 12/189 370/312 |
| 2010/0128709 A1* | 5/2010 | Liu et al. .................. 370/338 |
| 2011/0250908 A1* | 10/2011 | Olsson .................. G01S 5/0009 455/456.5 |
| 2012/0014371 A1* | 1/2012 | Weng .................... H04J 3/0682 370/350 |
| 2012/0250526 A1* | 10/2012 | Zhao .................... H04B 7/2606 370/243 |

FOREIGN PATENT DOCUMENTS

| | | |
|---|---|---|
| WO | 2007/124112 A2 | 11/2007 |
| WO | 2009/063001 A2 | 5/2009 |

* cited by examiner

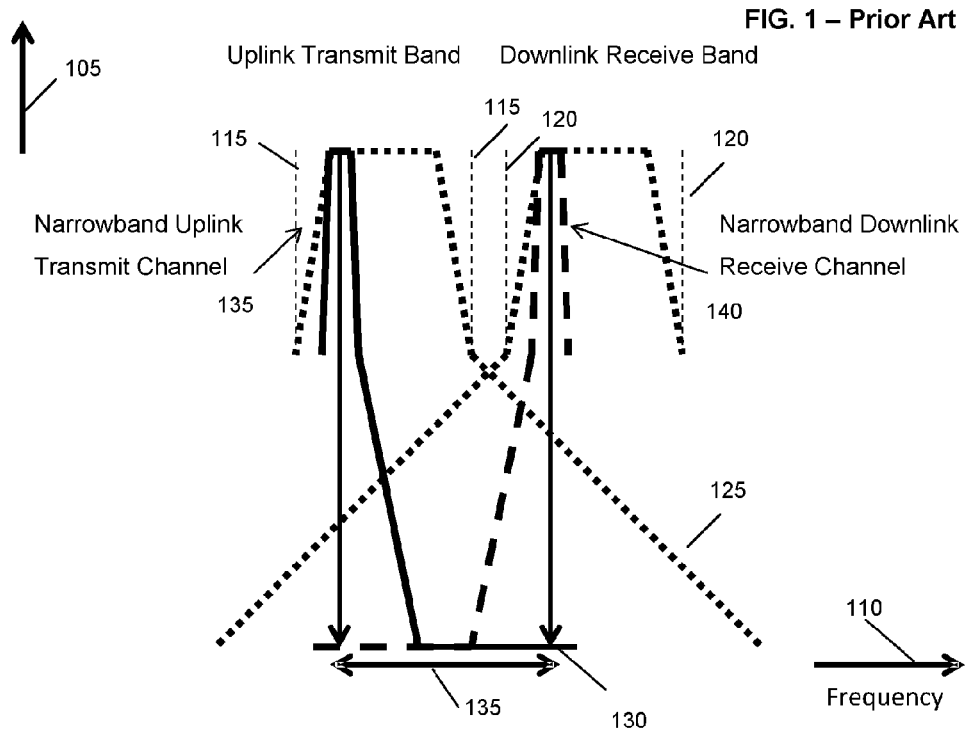
FIG. 1 – Prior Art
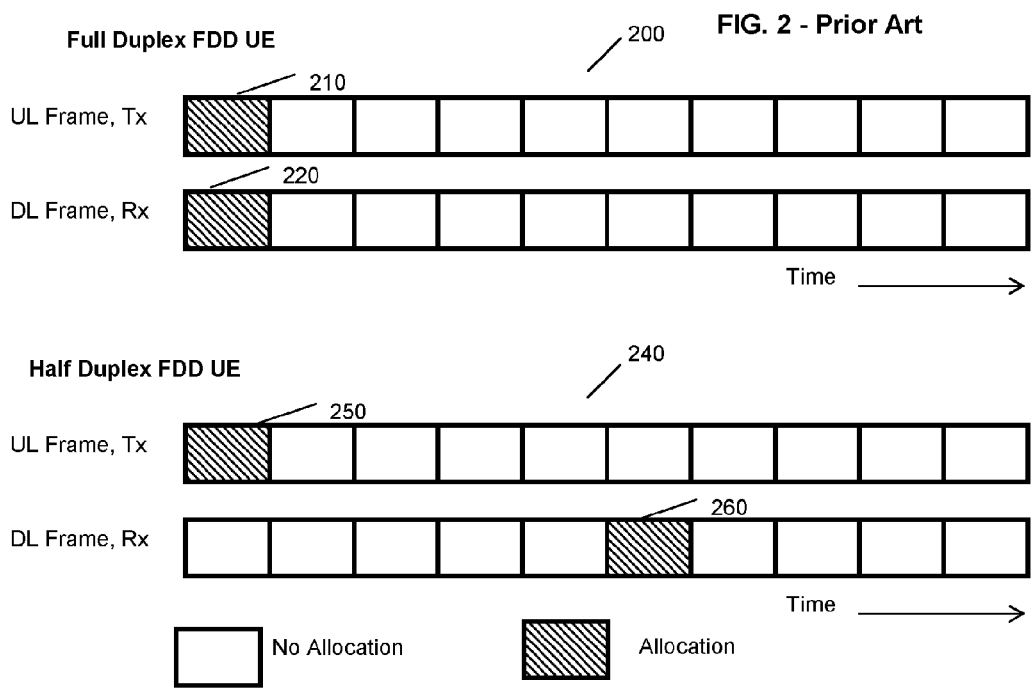
FIG. 2 - Prior Art

SCHEDULING COMMUNICATION IN A WIRELESS COMMUNICATION SYSTEM

This application is the National Stage Entry of PCT Application PCT/EP2011/069663, filed Nov. 8, 2011, which claims priority to GB Application No. 1019145.0, filed on Nov. 12, 2010, the entire contents of which are hereby incorporated by reference herein.

FIELD OF THE INVENTION

The field of this invention relates to scheduling communication resources in wireless communication systems and in particular, but not exclusively, to scheduling half duplex (HD) frequency division duplex (FDD) communication in a 3rd Generation Partnership Project (3GPP™) cellular communication system.

BACKGROUND OF THE INVENTION

During the 1980s and 1990s, second generation (2G) cellular communication systems were implemented to provide mobile phone communications. 3rd generation (3G) cellular communication systems have been widely installed during the past decade or so, to further enhance the communication services that may be provided to mobile phone users. The most widely adopted 3rd generation communication systems are based on Code Division Multiple Access (CDMA) and Frequency Division Duplex (FDD) or Time Division Duplex (TDD) technology.

FDD means that the transmitter and receiver, in a given device or base station, operate at different carrier frequencies. Uplink (UL) and downlink (DL) frequencies/sub-bands are separated by a frequency offset. FDD can be efficient in the case of symmetric traffic such as voice and as a consequence many historical spectral allocations are paired for FDD operation.

A full-duplex system, allows communication in both directions to/from a base station, and, unlike half-duplex, allows this to happen simultaneously. Land-line telephone networks are full-duplex, since they allow both callers to speak and be heard at the same time. Two-way radios can be, for instance, designed as full-duplex systems, which transmit on one frequency and receive on a different frequency.

A half-duplex system provides for communication in both directions, but only one direction at a time (not simultaneously). Typically, once a party begins receiving a signal, it must wait for the transmitter to stop transmitting, before replying. An example of a half-duplex system is a two-party system such as a "walkie-talkie" style two-way radio, wherein one user must indicate an end of transmission, and ensure that only one party transmits at a time, as both parties transmit on the same frequency, sometimes referred to as simplex communication.

A recent development in 3G communications is the long term evolution (LTE) cellular communication standard, sometimes referred to as 4th generation (4G) systems, which are compliant with 3GPP™ standards, which will be deployed in existing spectral allocations owned by Network Operators and new spectral allocations yet to be licensed. Irrespective of whether these LTE spectral allocations use existing 2G and 3G allocations being re-farmed for fourth generation (4G) systems, or new spectral allocations for existing mobile communications, they will primarily be paired spectrum for FDD operation.

In TDD systems, the same carrier frequency is used for both uplink (UL) transmissions, i.e. transmissions from the mobile wireless communication unit (often referred to as wireless subscriber communication unit) to the communication infrastructure via a wireless serving base station and downlink (DL) transmissions, i.e. transmissions from the communication infrastructure to the mobile wireless communication unit via a serving base station. In TDD, the carrier frequency is subdivided in the time domain into a series of time slots and/or frames. The single carrier frequency is assigned to uplink transmissions during some time slots and to downlink transmissions during other time slots. In FDD systems, a pair of separated carrier frequencies is used for respective uplink and downlink transmissions to avoid interference therebetween. An example of communication systems using these principles is the Universal Mobile Telecommunication System (UMTS™).

Typically, a wireless subscriber unit is 'connected' to one wireless serving communication unit, i.e. a base station serving one communication cell. Transmissions in other communication cells in the network typically generate interfering signals to the wireless subscriber unit. Due to the presence of these interfering signals a degradation of the maximum achievable data rate, maintained to the wireless subscriber unit, is typical. Such interference is often referred to as 'inter-cell' interference.

However, within the communication cell, a wireless subscriber communication unit may also observe/be affected by interference from other wireless subscriber communication units communicating within the same cell. Such interference is often referred to as intra-cell interference.

The duplex spacing, between uplink (UL) and downlink (DL) frequency carriers, and the duplex gap, i.e. the frequency separation between the uplink and the downlink band edges, often varies across the spectral allocations of FDD systems. In some instances, both the duplex spacing and the duplex gap can be set to be very narrow, for example with the duplex spacing~=2× channel bandwidth and the duplex gap~=1× channel bandwidth. In these instances half duplex operation of the mobile is desirable or more often as not essential, as it is practically impossible to achieve the required radio frequency (RF) filtering to perform full duplex FDD in a form factor that is compatible with the decreasingly small size of a communication handset.

The primary reason for this phenomenon in a handset is that a duplexer (radio frequency separator/filter) that allows simultaneous uplink and downlink operation, without interference from the other, is physically not realisable for cost and/or size reasons. In effect, the duplexer must, in the transmit path, essentially filter the adjacent channel leakage rejection (ACLR) emissions of the transmitter such that that the handset's transmissions leaking into the handset's receiver chain are well below the noise floor of the receiver. Furthermore, the duplexer must also, in the receive path, filter the transmit (UL) signal (in-band and not out-of-band), so that it does not block the receiver.

Referring now to FIG. 1, a graphical example 100 of the aforementioned FDD HD problem is illustrated with regard to transmit power 105 versus frequency 1 10. The UL transmit band 115 is shown as being adjacent the DL receive band 120. Within these frequency bands, paired narrowband UL transmit channels 135 and DL receive channels 140 are allocated, with UL channel transmissions that fall out-of-band for the downlink receive channel being filtered 125 to an acceptably low power level by the receive filter. UL adjacent channel emissions falling in-band for the downlink channel are filtered 130 to an acceptable level by the transmit filter. The paired nature of the narrow duplex Transmit-Receive separation (duplex spacing) 135 is also illustrated.

In the past, half-duplex systems, which were typically narrowband in nature, have relied on a combination of channel filtering (at baseband frequencies) and radio frequency (RF) band-filtering in the receiver in order to provide sufficient selectivity to protect against inter-user interference when two users are in close proximity. Thus, in HD FDD systems, one communication unit is scheduled UL resource in a first time slot whilst, for the same time slot, a second communication unit may be scheduled the DL resource. Taking, as an example, the Terrestrial European Trunked RAdio (TETRA), allocated spectral bands at 400 MHz, there are 2×5 MHz allocations with a 10 MHz duplex spacing between uplink and downlink carriers or 5 MHz duplex gap. The TETRA system operates with a narrow channel bandwidth of 25 kHz across the 2×5 MHz spectral allocations, so in this scenario the downlink channel is many channels away from the corresponding uplink channel. Thus filtering for full duplex operation is feasible.

However, in considering a 5 MHz deployment of an LTE system in this spectral band, the downlink channel will reside in the second adjacent channel of the uplink. The default second adjacent channel performance of an LTE user equipment (UE) is similar to that of a UMTS™ UE of the same bandwidth at −43 dBc. If the transmit power of the UE is +23 dBm, this means that the adjacent channel power, without any special filtering measures, is −20 dBm. The noise floor of a reasonable UE is typically around −100 dBm. Thus, in order to cause less than a 3 dB noise rise, the interference must also be at or below this level. Thus, a significant 80 dB additional selectivity (or RF signal rejection) is required from any duplexer or series of filters.

If, however, the use of TETRA in the 400 MHz band is replaced by a broadband data-oriented system, such as HD-FDD LTE, with a channel bandwidth of 5 MHz then filtering to the appropriate level 10 MHz away is much more difficult, if not impossible to achieve, given the current and projected state of the art in filter technology.

In a base station, where the size and cost of a duplexer is acceptable, the base station would still operate in full duplex communication utilising all of the available frequency/time resource. In the base station the aforementioned level of RF filtering can be achieved with machined metal cavity filters, sometimes using dielectric resonators, which today cost around US$500 and have a significant size at sub-1 GHz frequencies. Note that because the elements of these filters are proportional to the carrier wavelength their size increases with decreasing frequency. Thus, such types of components would never be suitable for small form factor handset style devices, whereas full duplex operation is still acceptable in a base station.

FIG. 2 illustrates an example of the timing 200 of full duplex FDD UE communications 200 and half duplex FDD communications 240. As illustrated, the full duplex FDD UE communication 200 allows allocation of simultaneous UL transmit 210 from, and DL receive 220 time slots to, the UE. As illustrated, the Half Duplex FDD UE communications 240 do not allow allocation of simultaneous UL transmit 250 and DL receive 260 time slots by a base station scheduler.

In a HD-FDD system the scheduler has the responsibility for not simultaneously allocating the same uplink and downlink slots to a given user. This solves the intra-user interference problem (i.e. the scheduler can ensure that the UE does not transmit and receive at the same time (or at least schedules time slots to allow sufficient switching time between transmit and receive operation).

However, there is a possibility of an inter-user problem between two handset devices if one user of a first handset is allocated a downlink slot whilst another user of a second handset in close proximity to the first handset is allocated the same uplink time slot. This inter-user problem is less serious than the potential intra-user problem due to the coupling loss (in addition to any duplexer attenuation). However, it has been appreciated that this can still present a serious problem if the interferer is transmitting at high power and the victim handset is at a communication cell edge.

Consequently, current techniques are suboptimal. Hence, an improved mechanism to address the potential inter-user interference problem, for example for a scenario where a new broadband system may be deployed in an historical spectral allocation traditionally used by a narrowband system, would be advantageous.

SUMMARY OF THE INVENTION

Accordingly, the invention seeks to mitigate, alleviate or eliminate one or more of the abovementioned disadvantages singly or in any combination.

According to aspects of the invention, there is provided, a cellular communication system, methods of operation, integrated circuits and communication units adapted or configured to implement the concepts herein described, as detailed in the appended Claims.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which:

FIG. 1 illustrates a known narrowband frequency division duplex (FDD) structure.

FIG. 2 illustrates a known radio full duplex (FD) and half duplex (HD) FDD framing/timing structure.

DETAILED DESCRIPTION OF EMBODIMENTS OF THE INVENTION

The following description focuses on embodiments of the invention applicable to a UMTS™ (Universal Mobile Telecommunication System) cellular communication system and in particular to a UMTS™ Terrestrial Radio Access Network (UTRAN) operating in any paired or unpaired spectrum within a 3rd generation partnership project (3GPP™) system. However, it will be appreciated that the invention is not limited to this particular cellular communication system, but may be applied to any wireless communication system that may suffer from potential inter-cell interference, for example in HD-FDD systems. However, in other examples, the inventive concept may be applied to adjacent channel TDD systems, for example in un-synchronised systems or when using uncoordinated switching points (UL/DL) within the frame and/or when performing joint scheduling between frequency carriers.

Figure 3:
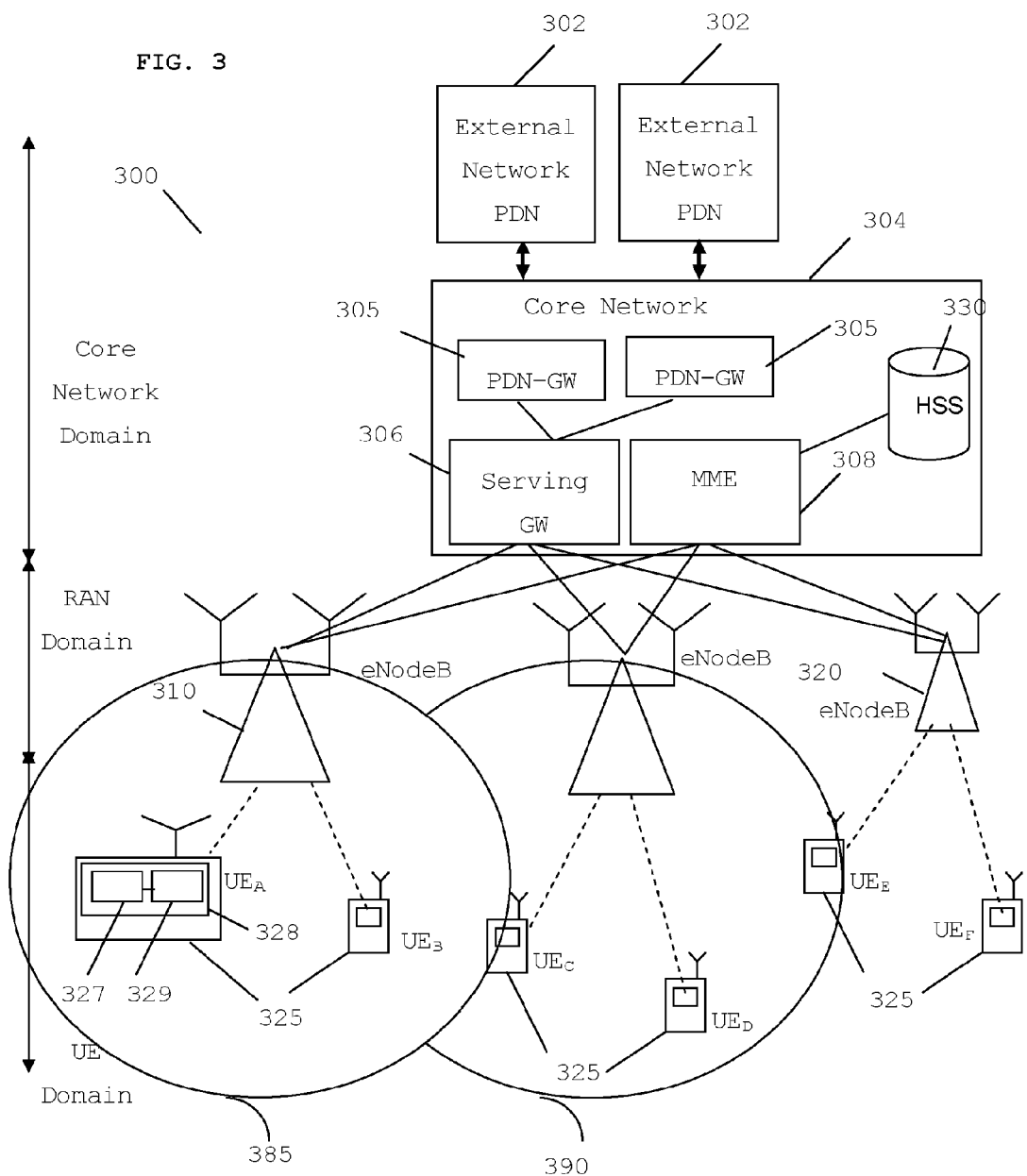
FIG. 3 illustrates a 3GPP™ LTE cellular communication system adapted in accordance with some example embodiments of the present invention.

Referring now to FIG. 3, a wireless communication system 300 is shown in outline, in accordance with one embodiment of the invention. In this embodiment, the wireless communication system 300 is compliant with, and contains network elements capable of operating over, a universal mobile telecommunication system (UMTS™) air-interface. In particular, the embodiment relates to a system's architecture for an Evolved-UTRAN (E-UTRAN) wireless communication system, which is currently under discussion in the third Generation Partnership Project (3GPP™) specification for long term evolution (LTE), operating with a half-duplex frequency division duplex (HD-FDD) mode and described in the 3GPP TS 36.xxx series of specifications.

The architecture consists of radio access network (RAN) and core network (CN) elements, with the core network 304 being coupled to external networks 302 named Packet Data Networks (PDNs), such as the Internet or a corporate network. The main component of the RAN is an eNodeB (an evolved NodeB) 310, 320, which is connected to the CN 304 via S1 interface and to the UEs 320 via an Uu interface. A wireless communication system will typically have a large number of such infrastructure elements where, for clarity purposes, only a limited number are shown in FIG. 3. The eNodeBs 310, 320 control and manage the radio resource related functions for a plurality of wireless subscriber communication units/terminals (or user equipment (UE) 325 in UMTS™ nomenclature). As illustrated, each eNodeB 310, 320 comprises one or more wireless transceiver unit 394 that is operably coupled to a signal processor module 396 and a scheduler 392 and communicates with the rest of the cell-based system infrastructure via an $1_{ub}$ interface, as defined in the UMTS™ specification. The series of eNodeBs 310, 320 typically perform lower layer processing for the network, performing such functions as Medium Access Control (MAC), formatting blocks of data for transmission and physically transmitting transport blocks to UEs 325. In addition to these functions that the eNodeBs 310, 320 usually perform, the adapted schedulers 392 of eNodeBs 310, 320 are additionally arranged to respond to demands for resource from the UEs 325 by allocating resource in either or both UL and/or DL time slots for individual UEs 325 to use.

In one example embodiment, the eNodeBs 310, 320 operate in full duplex, whereas the UEs 325 are allocated resources to operate in a half duplex mode of operation.

In one example embodiment, the scheduler 392 obtains an indication of user location, for example by specifically requesting and receiving such location information from a number of the UEs 325, or indeed by any other means such as a repository of UE location information that is regularly updated and accessible to network elements within the system.

The CN 304 has three main components: a serving GW 306, the PDN GW (PGW) 305 and mobility management entity (MME) 308. The serving-GW 306 controls the U-plane (user-plane) communication. The PDN-GW 305 controls access to the appropriate external network (e.g. PDN). In addition to this operation, in one embodiment, the PDN-GW 305 is arranged to police the DL AMBR for a number of non-GBR bearers that serve this particular UE-PDN connection. The MME 308 controls the c-plane (control plane) communication, where the user mobility, paging initiation for idle mode UEs, bearer establishment, and QoS support for the default bearer are handled by the MME 308.

E-UTRAN RAN is based on OFDMA (orthogonal frequency division multiple access) in downlink (DL) and SC-FDMA (single carrier frequency division multiple access) in uplink (UL), where the further information of radio frame formats and physical layer configuration used in E-UTRAN can be found in 3GPP TS 36.211 v.9.1.0 (2010-03), '3GPP Technical specification group radio access network, physical channels and modulation (release 9).

Each of the UEs comprise a transceiver unit 327 operably coupled to signal processing logic 329 (with one UE illustrated in such detail for clarity purposes only) and communicate with the eNodeB 310 supporting communication in their respective location area. The system comprises many other UEs 325 and eNodeBs 310, 320, which for clarity purposes are not shown.

In one example, the indication of user location may comprise one or more low layer timing advance values, where the network may control the timing of uplink transmissions from the UEs at different distances from the base station (eNodeB) in order to achieve synchronism at the base station (eNodeB). In this manner, the network may derive round-trip time distance information, or a path loss measurement such as SNR, SINR, CINR, BER, etc. made and reported by the UEs or higher layer network-based positioning information or global positioning system (GPS™) information.

In one example, the cell site (coverage area 385) supported by the eNodeB 310 may be tri-sectored (not shown), with three different cells around the site using independent scheduling to facilitate scheduling based on propagation loss, which could result from a UE being anywhere on the edge of a cell, and not necessarily in the locality of a high-power transmitting UE 325.

Thus, based on the determined location information of UEs 325 within the coverage area 385 of the eNodeB 310, the signal processor module 396 determines a likelihood of interference from UL to DL channels between UEs. In one example, the signal processor module 396 employs a notion of determining a safe (i.e. acceptable interference) distance between two users, beyond which it may be deemed to be safe for one user/UE 325 to transmit on an uplink time slot and the other user/UE to receive the downlink time slot at the same time, without interference occurring. In one example, a determination or calculation of a safe (interference) distance may encompass a selectivity calculation (as indicated previously) and may depend on one or more of several factors, such as: adjacent channel leakage rejection (ACLR), transmit power, acceptable noise rise, etc. In one example, it is envisaged that 'zones of exclusion' may be defined, using threshold levels, which may be of the order of a 10 m-20 m radius from the user/UE and may be configured to be dynamically dependent upon the resolution of the distance measurement.

Following a determination or calculation of a safe (interference) distance by the signal processor module 396, the scheduler 392 may perform a coordinated scheduling of multiple users/UEs 325, particularly taking into account those users/UEs that are likely to be in close proximity to one another. In particular, scheduler 392 pays attention to those users/UEs 325 that may be within the safe distance of one another and configures the scheduling of resources such that those users/UEs 325 are allocated simultaneous UL and DL time slots in UL and DL channels/frames. In contrast, users/UEs that may not be within a safe distance of one another is/are not allocated simultaneous UL and DL time slots in UL and DL channels.

Hence, in this manner, the eNodeB 310 is able to recognise and apply a notion of scheduling to avoid uplink-downlink time slot clashes in half duplex (HD) systems based on a determination of an interference potential between the at least two UEs (wireless communication units) when they are respectively communicating with the eNodeB (base station). In one example embodiment, the scheduling may be configured to avoid inter-user interference by using location information such that the scheduler 392 does not schedule simultaneous UL and DL resource to users that could be in close proximity.

In one example embodiment, the above concept may be extended to incorporate other measures of an 'ability to interfere' into the scheduling. One example of this extension is to predict the transmit power on the UL, and thereafter avoid the allocation of simultaneous UL and DL time slots/frames in the same area, or for scheduling UEs at the same distance near a cell edge, where the ability to interfere is greatest. In this example, the scheduler 392 may determine that two UEs were very close to the cell centre or site, and as such the potential interferer would be transmitting at a lower power (thereby leaving the victim to have a greater signal to noise headroom). Thus, in this instance, taking into account power information, interference is much less likely and simultaneous scheduling may be allowed.

Figure 5:
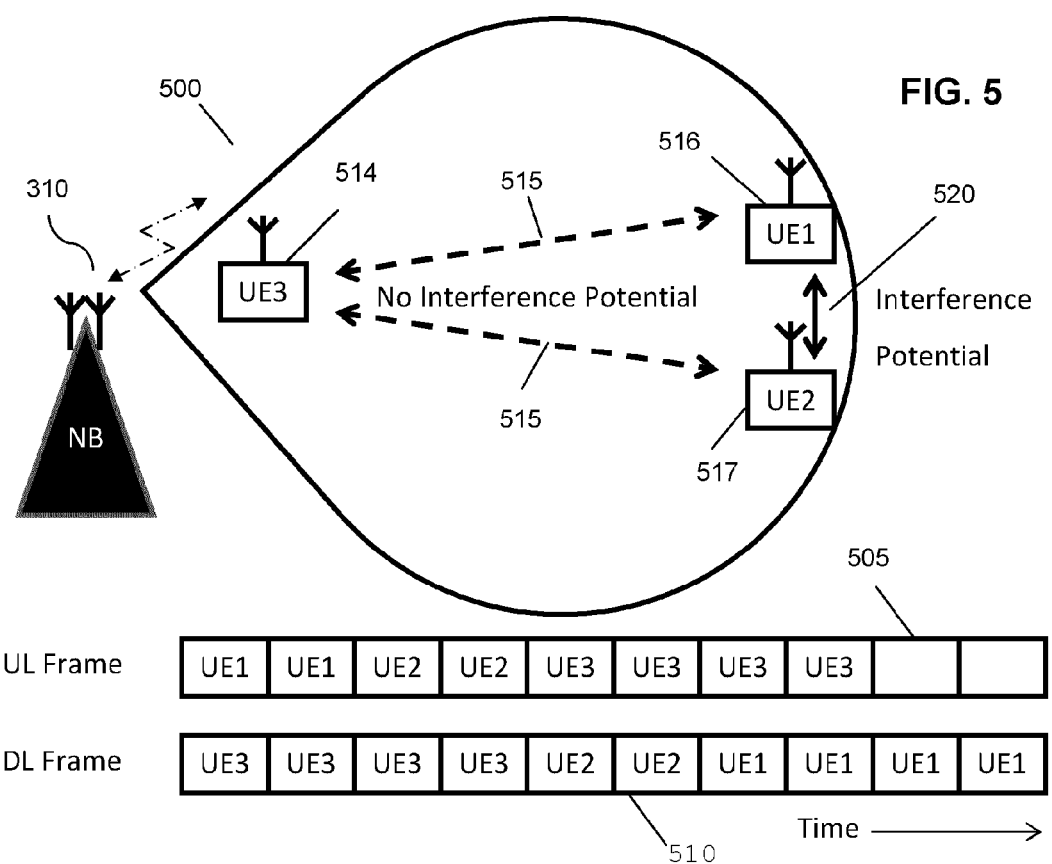
FIG. 5 illustrates a HD FDD system diagram and framing/timing structure in accordance with some example embodiments of the invention.

In one alternative example embodiment, MME 308 or serving GW 306 may comprise radio resource management (RRM) logic (not shown) which may comprise a scheduler in addition to or instead of the eNodeBs' scheduler 392. Here, RRM logic may instruct eNodeB 310 to inform the UEs 325 of the allocation of frequency resources, as illustrated in FIG. 5. Alternatively, in one example, the MME 308 or serving GW 306 may comprise processing logic for instructing an eNodeB 310, 320 to allocate time slots/sub-frames in the aforementioned manner. In this example, The RRM logic may schedule HD FDD resources in UL and DL channels across multiple cells/sites. In this regard, the RRM logic may utilize the users/UEs location information to identify whether a plurality of users/UEs may be in close proximity to each other at edges of cells, but where they are being served by separate eNodeBs. In such a situation, RRM logic may schedule resources in UL and DL channels across multiple cells/sites to avoid inter-cell interference due to close proximity users/UEs.

In one example embodiment, a signal processing module 396 may be configured to determine an interference potential between two users/UEs and may be arranged to repetitively perform such a determination on, say, a regular basis and/or dynamically in response to any location update.

In one example embodiment, the scheduling or updating of a schedule may be performed on at least one from a group consisting of; a time slot-by-time slot basis, a frame-by-frame basis, a multiframe-by-multiframe basis.

In one example embodiment, half duplex communication resource usage may be monitored in the wireless communication system and based thereon the scheduler may selectably initiating at least one from a group consisting of: determining location information of at least two wireless communication units of the plurality of wireless communication units; and determining an interference potential between the at least two wireless communication units when they are respectively communicating with the base station. Thereafter, the scheduler may schedule half duplex communication resource to the at least two wireless communication units based on the results of the selectably initiated determination.

In one example embodiment, scheduling of half duplex communication resource to at least two wireless communication units in close proximity may comprise treating the at least two wireless communication units as a single entity when scheduling half duplex communication resource and thereby avoiding scheduling the same resource to both of the at least two wireless communication units simultaneously. In this manner, close proximity wireless communication units will be treated as a group, with UL and DL resources allocated to the group. Internal to the group, UL and DL resources allocated to the group may be divided between the group, in an attempt to avoid simultaneous allocation of resources to these close proximity wireless communication units.

Figure 4:
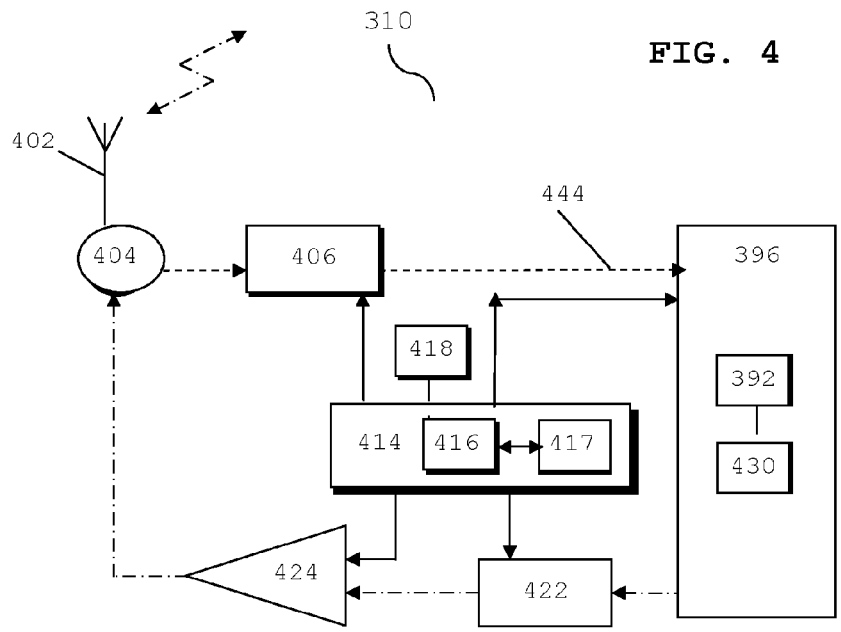
FIG. 4 illustrates a wireless serving communication unit, such as an eNodeB base station, adapted in accordance with some example embodiments of the invention.

Referring now to FIG. 4, a block diagram of a wireless communication unit, such as eNodeB 310, adapted in accordance with some example embodiments of the invention, is shown. The eNodeB 310 contains an antenna or an antenna array 402 or a plurality of antennae, coupled to antenna switch 404 that provides isolation between receive and transmit chains within the eNodeB 310. One or more receiver chains, as known in the art, include receiver front-end circuitry 406 (effectively providing reception, RF filtering and intermediate or base-band frequency conversion). The receiver front-end circuitry 406 is coupled to one or more signal processing module(s) 396. The one or more receiver chain(s) is/are operably configured to receive data packet streams in a plurality of time frames.

A controller 414 maintains overall operational control of the eNodeB 310. The controller 414 is also coupled to the receiver front-end circuitry 406 and the one or more signal processing module(s) 396 (generally realised by one or more digital signal processor(s) (DSPs)). The controller 414 is also coupled to or comprises (as shown) a buffer module 417 and one or more memory devices/elements 416 that selectively stores operating regimes, such as decoding/encoding functions, synchronisation patterns, code sequences, and the like. A timer 418 is operably coupled to the controller 414 to control the timing of operations (transmission or reception of time-dependent signals) within the eNodeB 310.

As regards the transmit chain, this includes transmitter/modulation circuitry 422 and a power amplifier 424 operably coupled to the antenna, antenna array 402, or plurality of antennae. The transmitter/modulation circuitry 422 and the power amplifier 424 are operationally responsive to the controller 414. The transmit chain is operably configured to transmit data packet streams to a plurality of users/UEs.

The one or more signal processor module(s) 396 in the transmit chain may be implemented as distinct from the one or more signal processor module(s) 396 in the receive chain. Alternatively, a single processor may be used to implement a processing of both transmit and receive signals, as shown in FIG. 4. Clearly, the various components within the wireless communication unit (e.g. eNodeB 310) can be realized in discrete or integrated component form, with an ultimate structure therefore being an application-specific or design selection.

In accordance with example embodiments of the invention, the signal processor module 396 has been adapted to comprise logic 430 (encompassing hardware, firmware and/or software) to determine whether a likelihood of interference in UL or DL channels with communications between the eNodeB 310 and multiple UEs. In one example, the logic 430 may determine whether a safe distance exists between two users/UEs, beyond which it may be deemed to be safe for one user/UE to transmit uplink communication and the other user/UE to simultaneously receive downlink communication without interference occurring. Following a determination or calculation of a safe (interference) distance, a scheduler 392 may perform a coordinated scheduling of users/UEs, particularly taking into account those users/UEs that are likely to be in close proximity to one another. In this example, scheduler 392 is shown as being functionally part of the signal processor module 396. In other examples scheduler 392 may be distinct from, and operably coupled to, signal processor module 396. In particular, scheduler 392 pays attention to those users/UEs that may be within the safe distance of one another and ensures the scheduling of resources such that those users/UEs are allocated simultaneous UL and DL time slots in respective UL and DL channels. In contrast, users/UEs that may not be within a safe distance of one another are not allocated simultaneous UL and DL time slots in respective channels.

Referring now to FIG. 5, a simplified example of a HD FDD system 500 and framing/timing structure is illustrated in accordance with some example embodiments of the invention. Example embodiments of the invention propose to schedule HD FDD resource according to determined UE locations and/or a perceived level of interference between UEs based on such determined locations.

In this example, eNodeB 310 is communicating with (and allocating resource to) at least three wireless subscriber communication units/terminals (or user equipment (UE) in UMTS™ nomenclature) 514, 516, 517. As shown, UE3 514 is located close to (e.g. in the geographical vicinity of) eNodeB 310. UE1 516 and UE2 517 are shown as being located close to (e.g. in the geographical vicinity of) each other, and at the edge of the communication cell. Consequently, UE1 516 and UE2 517 are shown as being capable of causing potential interference 520 with one another, with little or no interference potential 515 being caused to communications between the eNodeB 310 and the first UE3 514.

Therefore, following a determination or calculation of a safe (interference) distance by a scheduler of the eNodeB 310, the eNodeB 310 may perform a coordinated scheduling of UL time slot or frame resources 505 and DL time slot or frame resources 510 to users/UEs, particularly taking into account those users/UEs that are likely to be in close proximity to one another, such as UE1 516 and UE2 517. In particular, scheduler pays attention to those users/UEs that may be within the safe distance of one another, such as UE3 514 and either or both of UE1 516 and UE2 517. The scheduler then ensures that the scheduling of resources is such that those users/UEs are allocated/scheduled simultaneous UL and DL channels/frames, as illustrated. Thus, UE3 514 is allocated simultaneous DL or UL resources 505, 510 to geographically distal (and therefore little/no interference potential) UEs, such as UE1 516 and UE2 517. In contrast, users/UEs that may not be within a safe distance of one another, such as UE1 516 and UE2 517, are not allocated/scheduled simultaneous UL and DL channels/frames 505, 510.

Hence, the eNodeB 310 is able to recognise and apply a notion of scheduling to avoid uplink-downlink time slot/frame clashes in half duplex (HD) FDD or TDD systems based on a determination of an interference potential between the at least two UEs (wireless communication units) when they are respectively communicating with the eNodeB (base station). In one example embodiment, the scheduling may be configured to avoid inter-user interference by using location information such that the scheduler does not schedule simultaneous UL and DL resource to users that could be in close proximity.

One benefit of the aforementioned techniques is to reduce or negate a potential impact of interference between UEs operating in half-duplex communications with a full-duplex operating NodeB. Modifications to any existing scheduling entity, whether within the eNodeB or any other entity, may be applied that achieve one or more of the above benefits. Such modifications may involve re-configuring the radio resource control (RRC) layer and/or eNodeB Application Protocol (NBAP) in order to accommodate the improved scheduling of UL and DL resources. Advantageously, no modification to the core network and associated services/applications are required to achieve the aims of the aforementioned example embodiments.

Figure 6:
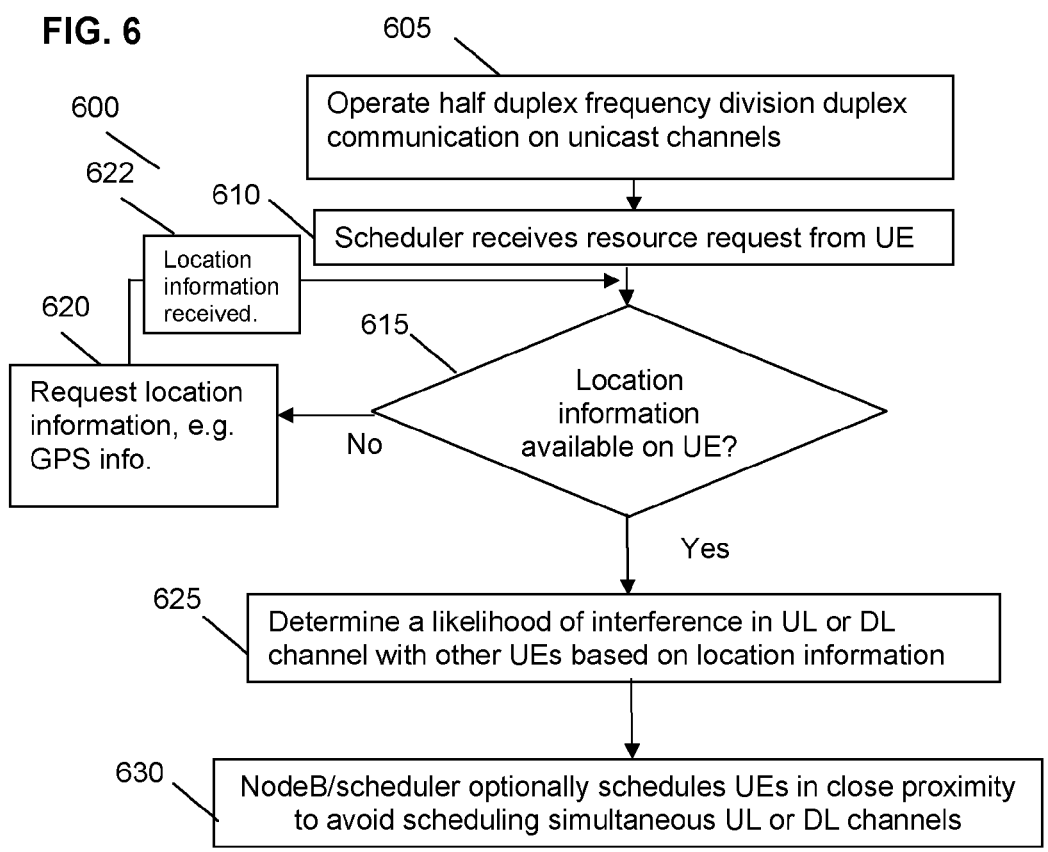
FIG. 6 illustrates an example of a flowchart to schedule HD FDD communication in accordance with some example embodiments of the invention.

Referring now to FIG. 6, an example of a flowchart 600 to support half duplex FDD scheduled communications between a base station and a plurality of wireless communication units is illustrated. The flowchart 600 starts with the wireless communication system operating in half duplex FDD communication on unicast channels, as shown in step 605. A scheduler, for example a scheduler in a Node B base station, receives a resource request from a wireless communication unit, such as a User Equipment (UE), in step 610. The base station then determines whether (or not) the base station has location information available for the UE, in step 615, for example previously stored location information or location information contained within the resource request. If the base station determines that it does not have location information available for the UE, in step 615, the base station may make a request to the UE for such information to be supplied to the base station, such as Global Positioning System (GPS) location information, as shown in step 620. The flowchart may then loop back to step 615 and the base station may then subsequently receive the requested location information, as shown in step 622.

If the base station determines that it does have location information available for the UE, in step 615, the scheduler makes a determination as to whether there is a likelihood of interference in either the UL or DL half duplex FDD channels with any other UE-base station communication, based on the location information of the requesting UE, should simultaneous time slots/frames be allocated, as shown in step 625. If the base station determines that there is a likelihood of interference in either the UL or DL half duplex FDD channels with any other UE-base station communication, based on the location information of the requesting UE, in step 625, the scheduler configures the HD FDD schedules for UEs, and particularly the requesting UE, to mitigate any possible interference. In one example, the scheduler configures the HD FDD scheduling for UEs that are in close proximity to other UEs to avoid simultaneous scheduling of UL and DL time slots/frames for those UEs.

Figure 7:
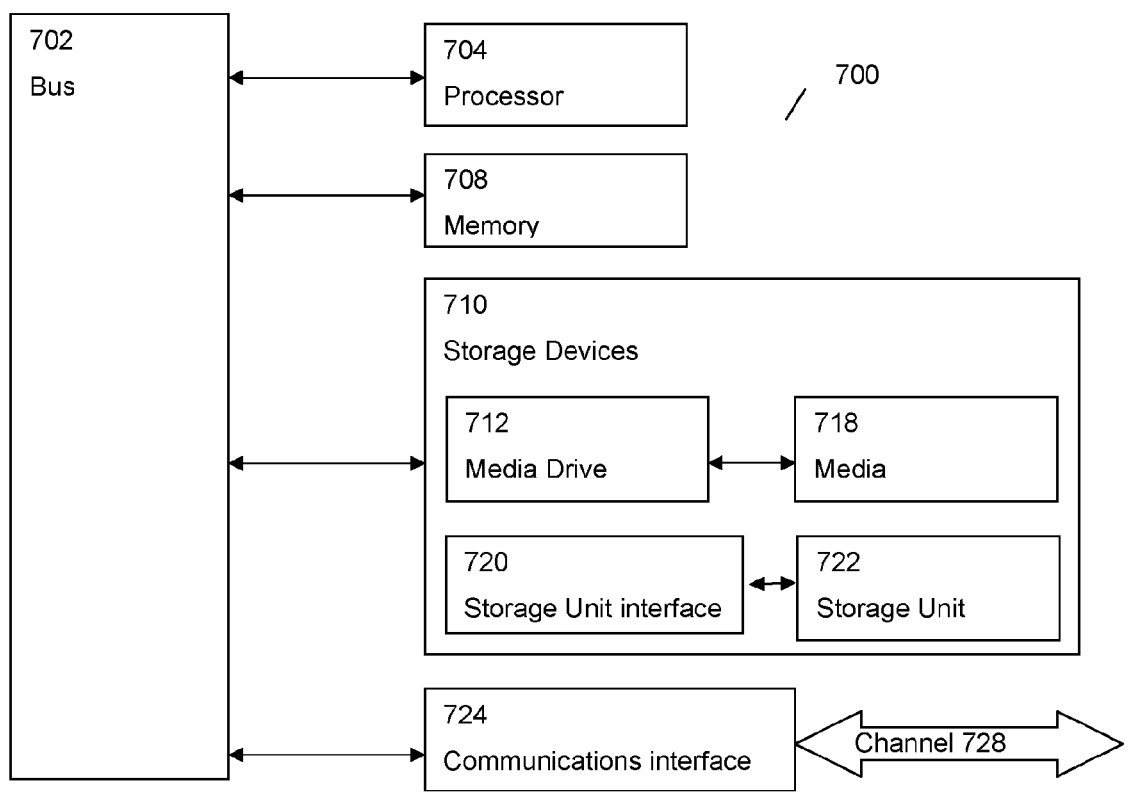
FIG. 7 illustrates a typical computing system that may be employed to implement signal processing functionality in embodiments of the invention.

Referring now to FIG. 7, there is illustrated a typical computing system 700 that may be employed to implement software controlled scheduling functionality in embodiments of the invention. Computing systems of this type may be used in wireless communication units. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special-purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 722, drive 712 or communications interface 724. The control logic (in this example, software instructions or computer program code), when executed by the processor 704, causes the processor 704 to perform the functions of the invention as described herein.

In one example, a tangible non-transitory computer program product comprises executable program code for scheduling half duplex communication in a communication cell of a wireless communication system supporting communication between a base station and a plurality of wireless communication units. The executable program code may be operable for, when executed in at least one from a group consisting of: a Core Network element, a radio resource manager (RRM), a Radio Access Network element such as a base station, for example in a form of an eNodeB: determining an interference potential between the at least two wireless communication units when they are respectively communicating with the base station; and scheduling half duplex communication resource to one or more wireless communication units based on the determined interference potential.

It will be appreciated that, for clarity purposes, the above description has described embodiments of the invention with reference to different functional units and processors. However, it will be apparent that any suitable distribution of functionality between different functional units or processors, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processing module 396 has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc. do not preclude a plurality.

What is claimed is:

1. A method performed by a network device, the method comprising:
   receiving, by the network device, satellite based location information from each user equipment (UE) of a plurality of UEs, wherein the received location information includes a geographical proximity between each UE of the plurality of UEs;
   determining, by the network device, an interference potential for each UE of the plurality of UEs based on a determined distance between a first UE and a second UE of the plurality of UEs from the received location information; and
   scheduling, by the network device, half duplex communication on a plurality of orthogonal frequency division multiplexing (OFDM) resources for the first UE and the second UE based on the determined interference potential, wherein the first UE is scheduled to receive information and the second UE is scheduled to transmit information on a substantially same time slot related to one of the plurality of OFDM resources when the determined distance is above a threshold value.

2. The method of claim 1 further comprising:
   requesting, by network device, that each UE of the plurality of UEs perform a measurement associated with determining their respective location to send to the network device.

3. The method of claim 1 further comprising:
   analyzing, by the network device, timing advance information of communications received from the plurality of UEs.

4. The method of claim 1 further comprising:
   scheduling, by the network device, half duplex communication resources according to a transmit power level of one of the plurality of UEs.

5. The method of claim 1 further comprising:
   determining, by the network device, another interference potential between the plurality of UEs on a condition that a UE of the plurality of UEs is communicating with the network device; and
   updating the scheduled half duplex communication on the plurality of OFDM resources based on the determined another interference potential.

6. The method of claim 1 further comprising:
   updating the scheduling of the half duplex communication on the plurality of OFDM resources on any one of a time slot-by-time slot basis, a frame-by-frame basis, or a multiframe-by-multiframe basis.

7. The method of claim 1 further comprising:
   monitoring, by the network device, half duplex communication resource usage.

8. The method of claim 1 further comprising:
   grouping, by the network device, the plurality of UEs as a single entity; and
   scheduling, by the network device, uplink or downlink communication resources to the group.

9. The method of claim 1 further comprising:
   determining, by the network device, path loss information of communications received from the plurality of UEs.

10. A non-transitory computer-readable program product with stored instructions executable by a computer, the instructions comprising:
    instructions to receive satellite based location information from each user equipment (UE) of a plurality of UEs, wherein the received location information includes a geographical proximity between each UE of the plurality of UEs;
    instructions to determine an interference potential for each UE of the plurality of UEs based on a determined distance between a first UE and a second UE of the plurality of UEs from the received location information; and
    instructions to schedule half duplex communication on a plurality of orthogonal frequency division multiplexing (OFDM) resources for the first UE and the second UE based on the determined interference potential, wherein the first UE is scheduled to receive information and the second UE is scheduled to transmit information on a substantially same time slot related to one of the plurality of OFDM resources when the determined distance is above a threshold value.

11. A network device comprising:
    a receiver configured to receive satellite based location information from each user equipment (UE) of a plurality of UEs, wherein the received location information includes a geographical proximity between each UE of the plurality of UEs;
    a processor configured to determine an interference potential for each UE of the plurality of UEs based on a determined distance between a first UE and a second UE of the plurality of UEs from the received location information; and
    the processor further configured to schedule half duplex communication on a plurality of orthogonal frequency division multiplexing (OFDM) resources for the first UE and the second UE based on the determined interference potential, wherein the first UE is scheduled to receive information and the second UE is scheduled to transmit information on a substantially same time slot related to one of the plurality of OFDM resources when the determined distance is above a threshold value.

12. The network device of claim 11 further comprising a transmitter configured to send scheduling information of the scheduled half duplex communication of the plurality of OFDM resources to the plurality of UEs.

13. The network device of claim 11, wherein the network device is any one of a core network element, a radio resource manager (RRM), or a base station.

14. The network device of claim 11 further comprising:
the processor further configured to determine an interference potential between the plurality of UEs on a condition that a UE of the plurality of UEs is communicating with the network device; and
the processor configured to update the scheduled half duplex communication of the plurality of OFDM resources based on the determined interference potential.

15. The network device of claim 11 further comprising:
the processor further configured to group the plurality of UEs as a single entity; and
the processor further configured to schedule uplink or downlink communication resources to the group.

* * * * *